Patented July 29, 1952

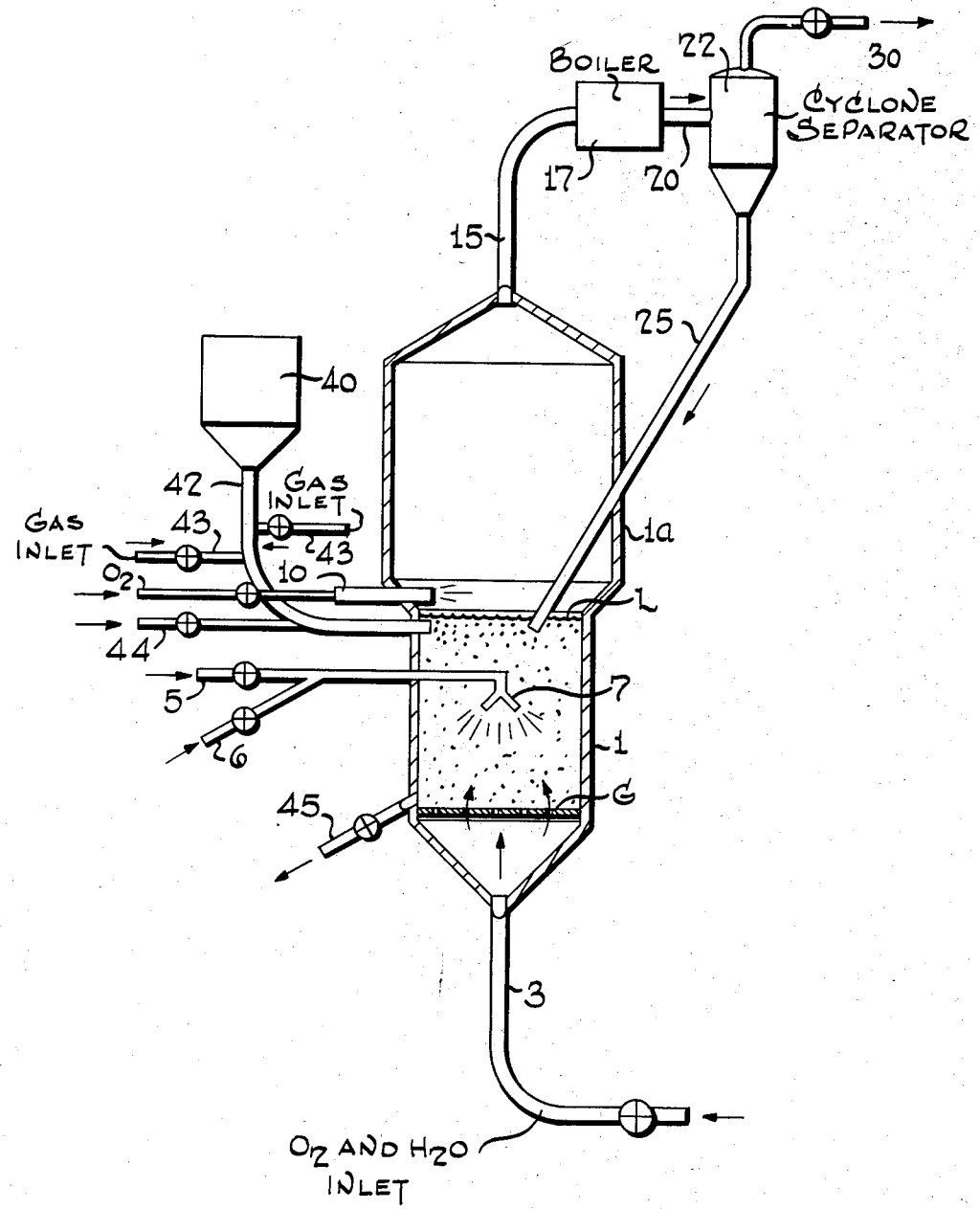

2,605,178

UNITED STATES PATENT OFFICE 2,605,178

PREPARATION OF GASEOUS FUEL

Charles E. Hemminger, Westfield, N. J., assignor to Standard Oil Development Company, a corporation of Delaware Application September 27, 1946, Serial No. 699,657

6 Claims. (Cl. 48—215)

The present invention relates to methods of synthesizing hydrocarbons and in particular it relates to methods of preparing a mixture of carbon monoxide and hydrogen suitable for use in hydrocarbon synthesis.

At the present time there is a great deal of interest in the problem of manufacturing synthetic fuels. The Government and the large oil companies have taken cognizance of the fact that the known petroleum oil reserves are reaching a foreseeable exhaustion in the not too distant future. At the present rate of increase in use, the known petroleum oil reserves will be insufficient to supply the demand in the foreseeable future. In seeking other possible sources of fuel, the oil industry has considered several possibilities including the hydrogenation of coal, the distillation of shale and/or tar sands, and the synthesis of hydrocarbons from carbon monoxide and hydrogen, the carbon monoxide and hydrogen being prepared either from natural gas by reforming or partial oxidation, or by coking a heavy oil and subjecting the coke thus formed to a water-gas reaction, or by treating a solid carbonaceous material at elevated temperatures with steam.

As previously stated, my present improvements go to the preparation of a mixture of carbon monoxide and hydrogen which may be reacted to form hydrocarbons and also oxygenated hydrocarbons. The materials I prefer to use are those heavy tars and pitches and natural asphalts, which, in quantity, equal the estimated reserves of oil and natural gas. For example, there are natural deposits of pitches readily available in localities such as in Trinidad and also there are considerable quantities of pitches for which heretofore there has been found no use, such as pitches which result from the distillation of Venezuelan crude. I may use any of these asphalt pitches and tars as well as other solid bitumen-containing materials such as oil shale, oil sands, or even coal of various ranges such as peat, lignite, etc., as the source of carbon and hydrogen, introducing carbon monoxide and hydrogen.

It is a main object of my invention, therefore, to produce carbon monoxide and hydrogen of a purity sufficient for the hydrocarbon synthesis more cheaply than has heretofore been possible.

More specifically, my invention involves the use of tars, pitches, low-grade coals, shale and other bituminous material as the starting material for the production of carbon monoxide and hydrogen.

Other and further objects of my invention will appear from the following more detailed description and claims.

In the drawing I have shown a reactor in which I produce carbon monoxide and hydrogen from heavy oily material or from solid material which may, however, be liquefied.

In brief, my invention involves a process for producing carbon monoxide and hydrogen in which the reaction may be performed in a single vessel by partially burning the raw material in the presence of substantially pure oxygen in the presence of added quantities of regulated steam adapted to supply hydrogen, to make up for any hydrogen deficiency in the carbonaceous material so as to produce finally a product containing from one to two mols of hydrogen per mol of carbon monoxide and limited quantities of carbon dioxide.

Referring in detail to the figure, I represents a reaction vessel or retort, cylindrical in shape having a convex crownpiece and a conical base and being provided in its lower section with a foraminous member G. I maintain within the reactor I a dense, turbulent suspension of powdered refractory material, such as silica, alumina or magnesia, etc., the refractory material having an average particle size of from 20 to 80 mesh and being maintained in the dense, turbulent suspension or "fluidized" state by causing gasiform material to flow upwardly therethrough at a relatively low superficial velocity. In other words, I introduce a mixture of oxygen and steam from an outside source through a line 3 and discharge the gaseous mixture into the bottom of reactor I where it passes upwardly through the grid G and flows through the reactor thereafter at a superficial velocity[1] of from ½ to 1½ feet per second. The manner of fluidizing solids to form the dense suspension I have referred to is now well known to those skilled in several arts, including the petroleum and related arts, and this technique has by now been in commercial use for several years in the oil cracking art. Sufficient powdered material is added or maintained within the reactor I to form a dense suspension having an upper level at L. A heavy oil such as the non-vaporizable material resulting from the vacuum distillation of the bottoms of a Venezuelan crude is introduced through line 5. Considerable quantities of this material are available in a locality called Aruba (in the Caribbean Sea, near Venezuela) for which no practical use has been found

---

[1] Superficial velocity signifies the velocity of the gas were the reactor empty.

up to this time. The non-vaporizable material or pitch is converted into a flowable state by heating to a temperature condition of from 200 to 450° F. In order to further increase the flowability of the heavy pitch, it is admixed with steam from line 6, which steam is injected into line 5 and this mixture is atomized in a spray head 7 disposed within the reactor as shown. In the drawing I have shown the spray nozzle or atomizer disposed within the dense phase but this may be located above L so as to spray the atomized pitch on to the top of the dense phase suspension. Instead of having a single spray there may be several disposed peripherally around the inner wall of the reactor 1. The oxygen fed into the reactor, as stated, causes a partial combustion of the atomized pitch to form carbon monoxide, hydrogen and a minor quantity of carbon dioxide. Since pitch is usually low in hydrogen content, I include steam with the oxygen, the amount of steam added being 0.5 to 5 mols per mol of oxygen added. The oxygen and steam used may vary from 0.3 pound of oxygen and 1.5 pounds of water per pound of pitch to 0.9 pound of oxygen and no water as it is desired to change the ratio of hydrogen to carbon monoxide in the product from about 1.8 to 1.0. During the partial combustion of the pitch in the dense phase suspension in the reactor, a temperature of from about 1500 to 2000° F. prevails and the pressure of from about 0 to 300 pounds per square inch gauge with pressures of 115 to 300 pounds preferred. Digressing for a moment, it should be pointed out that in the actual synthesis of the hydrocarbons and the oxygenated hydrocarbons from carbon monoxide and hydrogen, in the interest of suppressing carbon formation on the catalyst in that synthesis reaction, it has been found advisable to operate at superatmospheric pressure and in this present reaction I prefer to operate at superatmospheric pressure so as to produce a gas which will be under superatmospheric pressure and can be delivered in that state to the synthesis reactor.

Referring again to the reaction in the dense phase, it should be pointed out that along with the carbon monoxide, hydrogen, and carbon dioxide formed, substantial quantities of soot and vaporizable hydrocarbons are formed due to cracking. The products of the reaction ascend from the dense phase into the upper portion of the reactor, and in the said upper portion of the reactor, that is, above the dense phase level L, I add a quantity of secondary oxygen through a line 10 for the purpose of partially oxidizing the lighter hydrocarbons and the soot or solid carbonaceous material. A temperature in the upper portion of the secondary burning zone which extends from L to the top of the reactor of from 2000 to 3000° F. is attained. The amount of secondary oxygen added per pound of pitch fed is from 0.1 to 0.5 pound. The products of the reaction are withdrawn from the retort through line 15, thence discharged into a waste heat boiler 17 where a substantial quantity of sensible heat is recovered and the products are withdrawn from the waste heat boiler at a temperature of about 400° F. through a line 20 and discharged into one or more gas-solids contacting devices such as "cyclones" 22, for the purpose of separating out entrained fines which may unavoidably pass up through the reactor and exit with the products. The separated fines are returned via standpipe 25 to the reactor at a point preferably below L. The products are finally recovered for use in the synthesis reaction through a line 30. The products in line 30 may be cooled to as low as 100° F. or at least below the condensation temperature of steam before introduction into the hydrocarbon synthesis reaction zone (not shown herein) for the purpose of condensing out and separating water.

Referring again to the reactor 1, attention is directed to the fact, as shown in the drawing, that the upper portion 1a of the retort is of greater internal diameter than the lower section. This expanded upper section is necessary because of the additional oxygen added thereto as well as the additional expansion of the gases due to the higher temperature resulting from the addition of the secondary oxygen. The diameter of the upper section should be such that the gas velocity therein is less, say, in the order of ½ of the velocity in the lower section. In other words, as stated, where the superficial gas velocity in the lower section is from ½ to 1½ feet per second, the gas velocity in the upper expanded section should be of the order of ¼ to ¾ of a foot per second.

Then, it may, and often does, happen that the pitch which is introduced through line 5 contains substantial quantities of salts along with other metallic compounds, such as vanadium, calcium, and iron, which may exist as chlorides, oxides, or metallo-organic compounds. It is desirable, therefore, to continuously supply fresh powdered refractory material to the retort and to remove refractory material contaminated with the aforementioned compounds. To this end, therefore, I provide a hopper 40 in communication with a standpipe 42 through which standpipe refractory material may be fed from the hopper 40 to the reactor or retort. At the same time contaminated solids are withdrawn from the reactor through the drawoff pipe 45.

It will be noted in the design which I have described that in the lower portion of the retort a temperature not exceeding about 2000° F. exists, and at this relatively lower temperature any salts or other compounds which may be present in the hydrocarbon feed do not ordinarily melt or flux and, therefore, it is an important advantage of my invention to maintain the lower section of the retort at a temperature below that at which the fluxing ash of the salts and other compounds which might be present in the oil would impair the fluidized solids. Of course, in the case where the oil is not contaminated with the salts, it will not be necessary ordinarily to continuously add fresh powdered solids and withdraw the same.

Another modification of my invention employs the retort illustrated or depicted in the drawing but omits the bed of fluidized solids, spraying the oil into an atmosphere of oxygen and steam. The oil may be separately introduced as a side stream or it may be mixed with the oxygen and steam and introduced into the bottom of the reactor.

Another important phase of the invention is that in some instances to produce the gas of a certain composition, it may be desirable to introduce carbon dioxide into the bottom section of the reactor with the oxygen and steam.

In the event that the hydrocarbon material or the material containing carbon and hydrogen cannot be rendered into a flowable condition readily, the same, as in the case of, say, asphalt, may be ground and mixed with the refractory powdered material (as the silica), placed in hopper 40 and then withdrawn through the standpipe 42 and discharged into the bottom section of reactor 1. The silica or other refractory material forms as a fluidized bed in the reactor in the presence of the gasiform material flowing upwardly therethrough and the asphalt which is ground, say, to an average particle size of about 10 mesh, undergoes partial combustion forming carbon monoxide, hydrogen and carbon dioxide, along with some vaporizable hydrocarbons and carbon or soot. The gasiform and finely divided solid materials pass upwardly as before into the appended portion of the reactor and are treated as described hereinbefore. The powdered refractory material containing whatever ash may be formed is withdrawn from the bottom of the reactor through line 45 and discarded from the system, or a portion of this material withdrawn through line 45 may be mixed with fresh refractory powdered material and returned to hopper 40 for further use in the process.

In the case of, say, shale or other high ash-containing solid carbonaceous material, the same may be ground and introduced into hopper 40. In this case it may not be necessary to employ a powdered refractory material. The ground shale or other high ash-containing carbonaceous material is withdrawn from 40 through the standpipe 42 and discharged into the retort where the carbonaceous material undergoes partial combustion and the unburned residue is withdrawn through line 45. The procedure for treating the gasiform and finely divided carbonaceous material which passes into the upper portion of the retort is treated as described before in connection with the other modifications. Attention is directed to the fact that where powdered material is fed from hopper 40 to reactor 1 via line 42 it is desirable to provide the pipe 42 with gas taps 43, through which taps a gas may be injected into the line 42 for the purpose of increasing the fluidity of the material therein, thus preventing bridging, plugging, etc. Also it may be desirable to inject steam via line 44 into line 42.

Numerous modifications of my invention will suggest themselves to those who are familiar with this art without departing from the spirit thereof.

I claim:

1. The method of forming a mixture of gases containing a preponderance of carbon monoxide and hydrogen which comprises maintaining a fluidized bed of a powdered non-carbonaceous refactory material in a confined reaction zone, feeding to said reaction zone liquified hydrocarbonaceous material, separately charging a mixture of oxygen and steam to said reaction zone, maintaining a temperature in the fluidized bed of powdered refractory material not above 2000° F. but sufficiently high to cause a reaction between the bituminous material, the oxygen and the steam to form a gaseous mixture containing carbon monoxide and hydrogen, withdrawing a gaseous product containing the carbon monoxide, the oxygen and the hydrogen from the said fluidized bed, discharging the mixture into a space disposed in said reaction zone above said fluidized bed of powdered refractory material in said zone, adding oxygen to said space to convert further hydrocarbonaceous material in said space to additional quantities of carbon monoxide and hydrogen at a temperature within the range of about 2000°–3000° F., but substantially higher than said first named temperature, and recovering from said space a gaseous material substantially free of hydrocarbons and containing a preponderance of carbon monoxide and hydrogen.

2. The method set forth in claim 1 in which the liquified hydrocarbonaceous material is a normally solid petroleum pitch.

3. The method set forth in claim 1 in which the temperature in the lower portion of the reaction zone is maintained below the fusion point of the ash contained or formed from the said hydrocarbonaceous material.

4. The method of claim 1 in which the process is conducted under a superatmospheric pressure of up to about 300 lbs. per sq. in.

5. The method set forth in claim 1 in which a temperature from 1500 to 2000° F. is maintained in the lower portion of the reaction zone.

6. The method set forth in claim 1 in which the gases in said space have a superficial linear upward velocity substantially lower than the gases in said zone.

CHARLES E. HEMMINGER.

REFERENCES CITED

The following references are of record in the file of this patent:

UNITED STATES PATENTS

| Number | Name | Date |
| --- | --- | --- |
| 1,687,118 | Winkler | Oct. 9, 1928 |
| 1,840,649 | Winkler et al. | Jan. 12, 1932 |
| 1,913,968 | Winkler | June 13, 1932 |
| 2,346,754 | Hemminger | Apr. 18, 1944 |
| 2,445,328 | Keith | July 20, 1948 |

FOREIGN PATENTS

| Number | Country | Date |
| --- | --- | --- |
| 255,423 | Great Britain | Aug. 19, 1927 |
| 578,711 | Great Britain | July 9, 1946 |

OTHER REFERENCES

Ser. No. 303,852, Szigeth (A. P. C.), published April 27, 1943.